United States Patent [19]
Wedeck et al.

[11] Patent Number: 5,914,767
[45] Date of Patent: *Jun. 22, 1999

[54] EYEGLASS FRAME ADAPTED TO REMOVAL AND INSERTION OF LENSES

[75] Inventors: David Wedeck, 423 Forest Ave., Teaneck, N.J. 07666; Edward Cheslock, Lincoln University, Pa.; Brian Hoffman, Trenton, N.J.

[73] Assignee: David Wedeck, Teaneck, N.J.

[ * ] Notice: This patent is subject to a terminal disclaimer.

[21] Appl. No.: 08/990,056

[22] Filed: Dec. 12, 1997

Related U.S. Application Data

[63] Continuation-in-part of application No. 08/794,321, Feb. 3, 1997, Pat. No. 5,760,866, which is a continuation-in-part of application No. 08/689,223, Aug. 7, 1996, abandoned.

[51] Int. Cl.⁶ ............................................. G02C 1/08
[52] U.S. Cl. ......................................... 351/92; 351/90
[58] Field of Search ............................. 351/92, 90, 91, 351/93, 94, 95, 96, 97, 98, 99, 100, 107, 102, 41, 103

[56] References Cited

U.S. PATENT DOCUMENTS 5,760,866  6/1998  Wedeck et al. .......................... 351/92

*Primary Examiner*—Hung Xuan Dang
*Attorney, Agent, or Firm*—Richard B Klar, Esq.

[57] ABSTRACT

The invention relates to an eyeglass frame having a portion of the frame removably coupled to the body of the frame to permit the removal and replacement of the lenses in the frame.

20 Claims, 6 Drawing Sheets

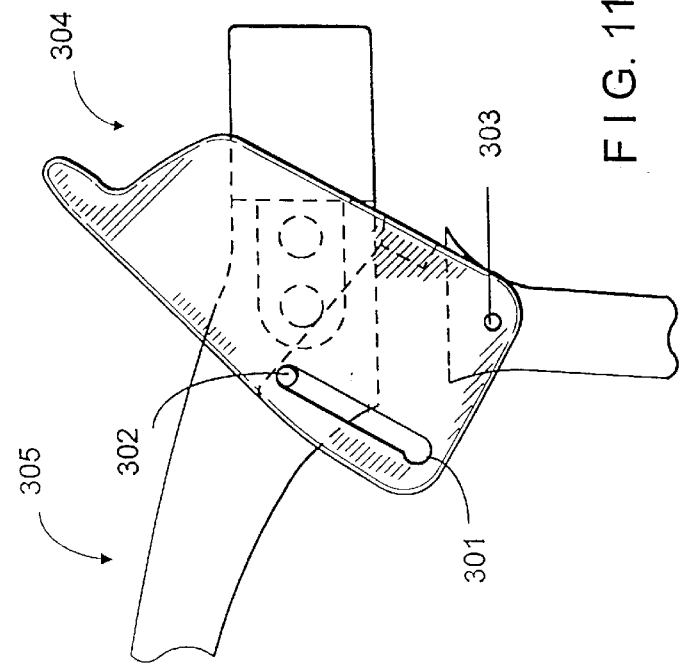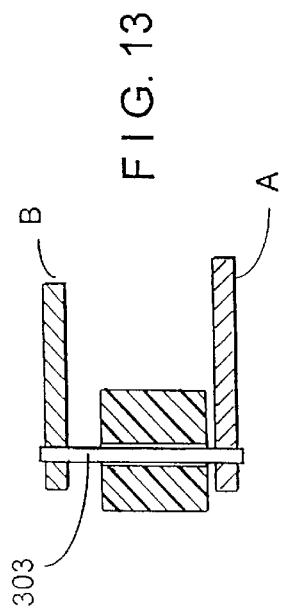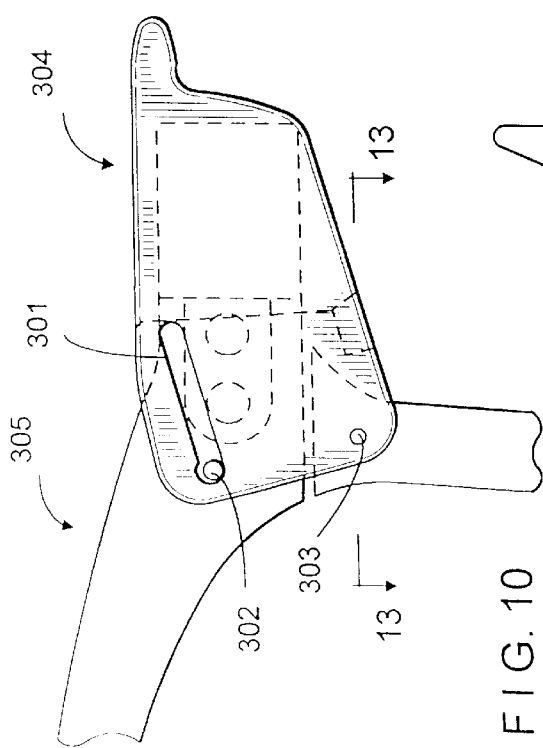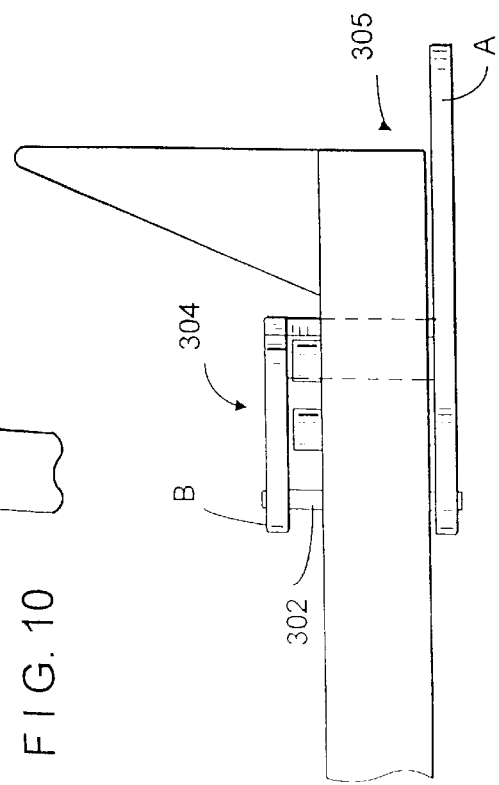

EYEGLASS FRAME ADAPTED TO REMOVAL AND INSERTION OF LENSES

The present application is a continuation in part application of U.S. patent application Ser. No. 08/794,321 which was filed on Feb. 3, 1997 now U.S. Pat. No. 5,760,866 and which in turn is a continuation in part of U.S. patent application Ser. No. 08/689,223 filed on Aug. 7, 1996 for which priority is claimed herein pursuant to 35 USC 120 now abandoned.

BACKGROUND OF THE INVENTION

1. Field of the Invention

The present invention relates to an eyeglass frame, in particular it relates to an eyeglass frame where at least a portion of the frame can be removably coupled to the body of the frame to permit the removal and replacement of the lenses in the frame.

2. The Prior Art

The prior art teaches a number of eyeglass frames. For example, the U.S. Pat. No. 3,826,564 to Werling has a hinge mechanism and a clasp mechanism. The clasp and hinge mechanisms are cumbersome, conspicuously visible, and aesthetically displeasing. The frame can be opened up to permit the lenses to be removed. Similarly the U.S. Pat. No. 2,479,754 to Marks discloses a frame that permits the lenses to be removed. As shown in FIG. 1 of Marks', the frame has a hinge base 16 with a stud 17 that goes through the top portion 14. Hinge screw 16 provides a pivot for a portion at the temple.

All of the prior art proposals are both cumbersome and aesthetically inappropriate for today's eyeglass frames, notably designer frames, which are primarily meant to be aesthetically pleasing. It would, therefore, be most desirable to provide a lens frame which would permit lenses to be removed, while at the same time requiring a minimum amount of disassembly and reassembly on the part of the wearer and also an insignificant amount of clasping or hinge mechanisms on the frame itself, which would add unnecessary weight to the frame and also would be unattractively visible on the frame when worn by the wearer.

SUMMARY OF THE INVENTION

It is a principle object of the invention to provide an aesthetically pleasing, simple mechanism which permits the frame to be opened and for lenses to be removed and replaced. Such an invention will permit new lenses to be inserted when the old lenses become scratched or a new prescription is required. In addition, lenses to be used in the outdoors, such as prescription sunglass lenses or tinted lenses can be inserted and the same frame can be utilized.

It is a further object of the invention to provide an invention which can be used for both metal frames as well as for plastic eyeglass frames.

It is a further object of the invention to provide another embodiment utilizing a cam to facilitate the opening and closing of the frame and an alignment pin and alignment recess to align the upper and bottom portions of the frame during opening and closing of the frame.

It is yet another object of the invention to provide a mechanism for restricting the amount of movement by which the frame can be opened to prevent the lenses from accidentally falling out of the frame while either being opened or in the fully opened position by limiting the degree to which the frame opens and providing guide means in the form of a slot and a journey pin traveling within the slot and to ensure that the frame is closed flush in the closed position.

Other objects will become known from the following drawings and description.

DESCRIPTION OF THE DRAWINGS

FIGS. 7–9 illustrate another embodiment of the present invention in which:

FIG. 7 is a partial sectional view of an embodiment of the invention with the frame in the closed position;

FIG. 8 is a partial sectional view showing the rotatable latch rotated as the latch pin and the cam become tightly compressed against each other due to the cam profile; and FIG. 9 is a partial sectional view showing the frame in the opened position.

FIGS. 10–13 illustrate another embodiment of the present invention utilizing a slot, a journey pin and a pivot pin and a lever, in which:

FIG. 10 illustrates a partial view of the frame in which the frame is in a substantially closed position and the journey pin and the pivot pin are at the closest proximity to each other when the frame is closed;

FIG. 11 shows the embodiment of FIG. 10 with the lever rotated so that the frame is in the open position and the journey pin and the pivot pin being the furthest distance away from each other;

FIG. 12 is a sectional view of the embodiment of FIG. 10 showing the lever is pivotally connected to the frame by the pivot pin; and FIG. 13 is a sectional view illustrating that the pivot pin 303 goes through both sides A and B of the lever and the frame.

DETAILED DESCRIPTION OF PREFERRED EMBODIMENTS

Figure 1:
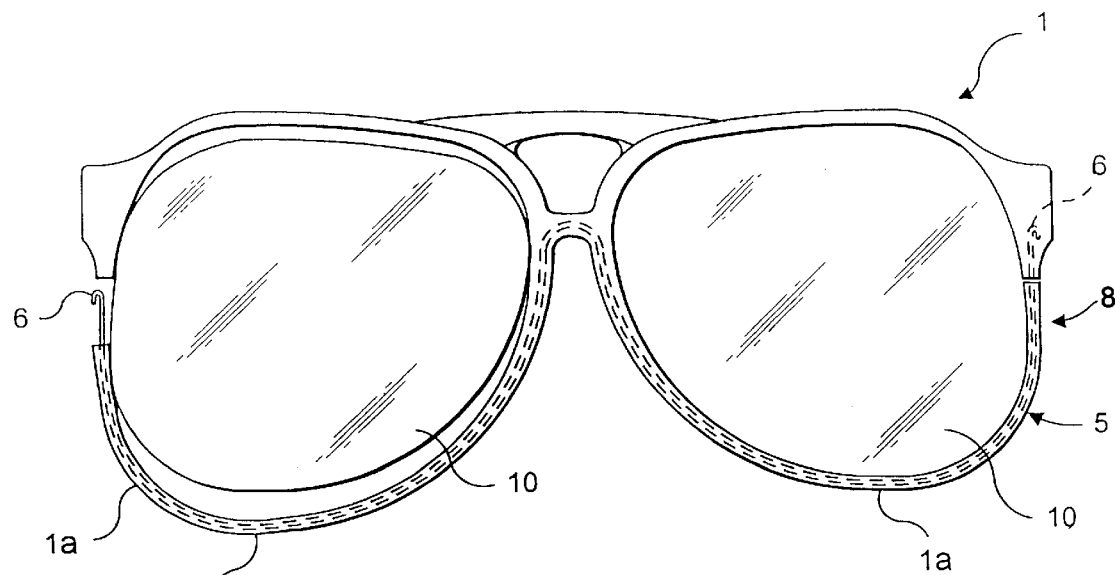
FIG. 1 is a front view of the eyeglass frame showing the retaining wire member unlocked on the left side.
Figure 2:
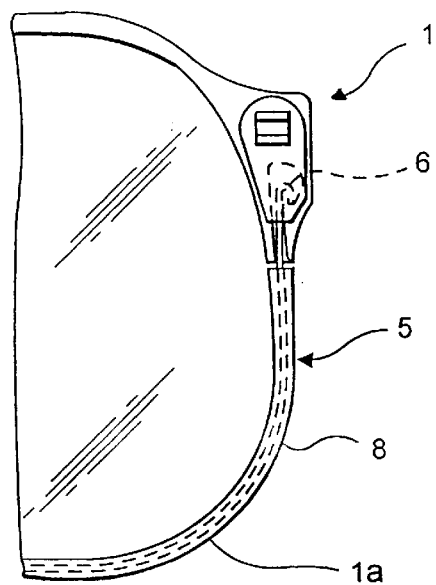
FIG. 2 is a partial rear view, showing the retaining member in locked position on the eyeglass frame.
Figure 3A:
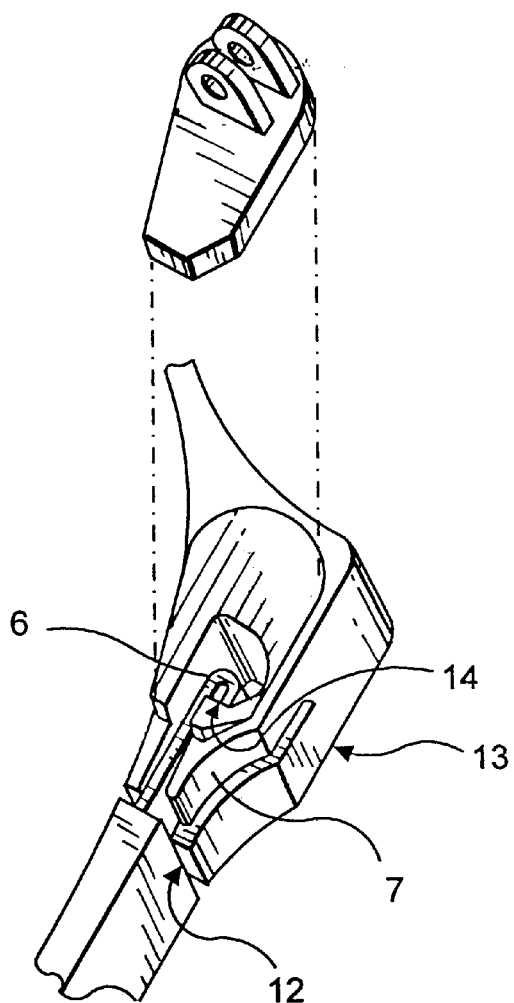
FIG. 3a is a partial perspective exploded, view of the frame in a locked or latched position.
Figure 3B:
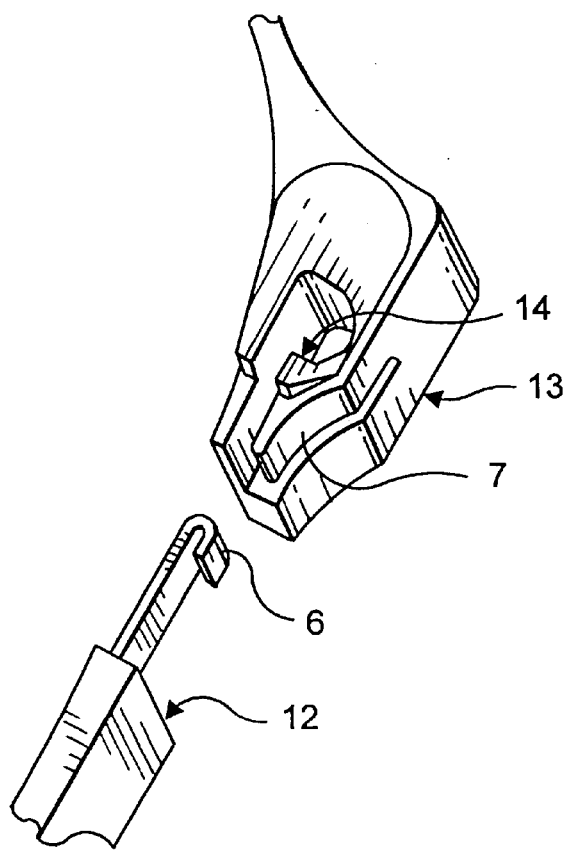
FIG. 3b is the same as FIG. 3a except the retaining member or hook is in a disengaged position.
Figure 3C:
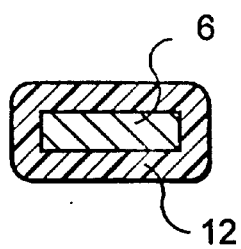
FIGS. 3c and 3d show a section of the bottom part of the frame (taken from FIG. 1), showing two different shapes of the wire inside.
Figure 3D:
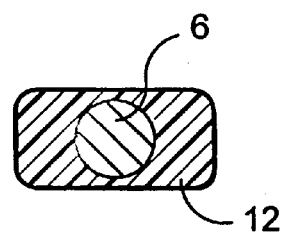

Referring now to the drawings, and in particular the embodiment of FIGS. 1–4c, reference is made to FIG. 1 in which an eyeglass frame 1, in this case made of plastic is shown. This can be seen from the drawings in the bottom portion 1a of the frame 1 which has a spring mechanism 5 therein. The spring mechanism 5 terminates in the preferably hook-shaped wire 6 which latches on to a portion 13 of the frame 1. As can be seen in FIGS. 3a and 3b, this hook mechanism 6 latches on so that the upper part 13 of the frame 1 attaches to the lower portion 1a of the frame 1 in which the spring 5 is embedded therein.

Figure 4C:
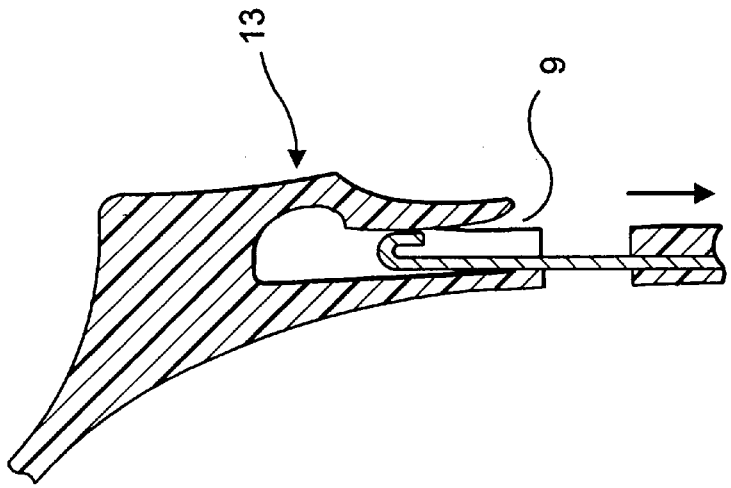
FIGS. 4a–c show three different stages of unlocking the frame in order to change the lens.
Figure 4B:
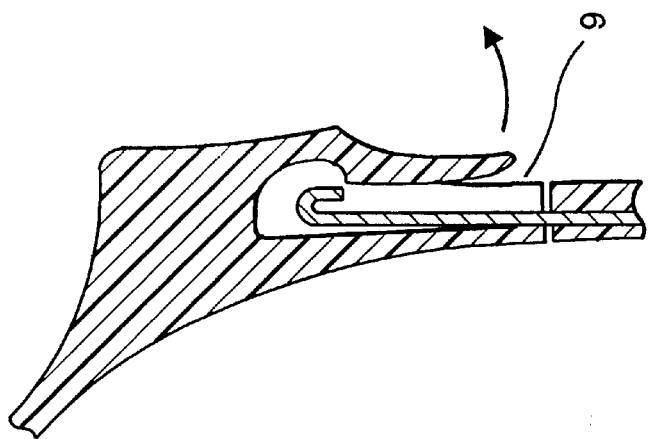
Figure 4A:
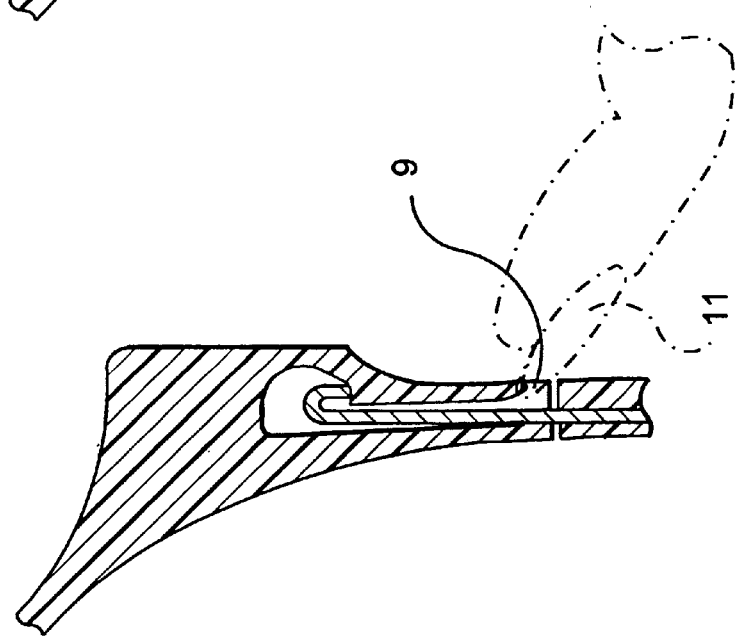

FIGS. 4a–4c show the manner in which this mechanism can be released. The side portion 2 of the frame 1 has a little latch or groove 9 which can be pulled by an implement or fingernail 11, so as to release the hook portion 6 of the wire 5 therefrom and permitting the frame 1 to open up. This disengagement can be done on both ends of the eyeglass frame 1 and permits the lenses 10 to be removed and replaced.

This wire retainer or hook 6 is perfectly formed to the shape of the frame 1 and is tempered to provide a slight spring action. The cross section can either be round (FIG. 3C) or rectangular(FIG. 3D), but can be made round and flattened and folded on one end. The round would more easily be contoured to the shapes of the frames. Alternatively, the wire 5 does not have to travel the full width of the glasses but can extend into the end of the frame by approximately 1/10 of an inch. A plastic frame then would be able to serve as a display and the wire can act as a retainer. The plastic in this case would have to be carefully chosen so that the proper spring action can be obtained and there would be no fatigue failure after repeated uses.

Figure 5:
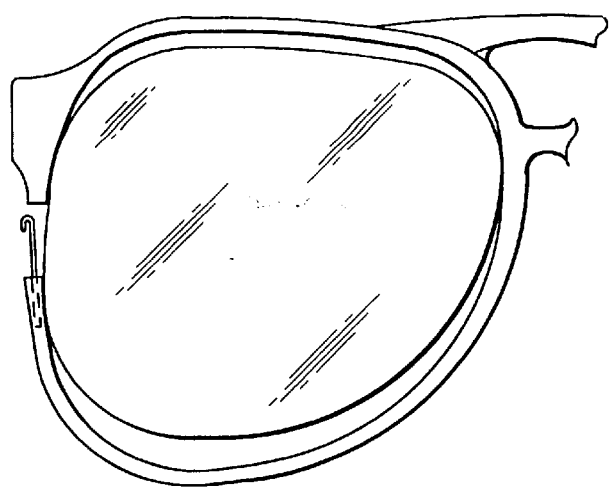
FIG. 5 shows the combination of a plastic frame where the frame itself includes a portion that acts as a spring.

The retainer plate portion 14 of the frame which is shown as part of the retaining means would require that the hinge or retainer would preferably be assembled in the post molding operation. The retainer plate 14 keeps the retainer 6 from disengaging from the rear without pulling out the catch as shown in FIG. 5.

The retainer plate could be designed separately assembled, allowing the retainer to be molded in as it is presently. The molded in catch can be operated with a thumbnail or any flat pointed object, such as a pocket knife or a small screwdriver.

The plastic frame itself can be molded in the open position.

Figure 6:
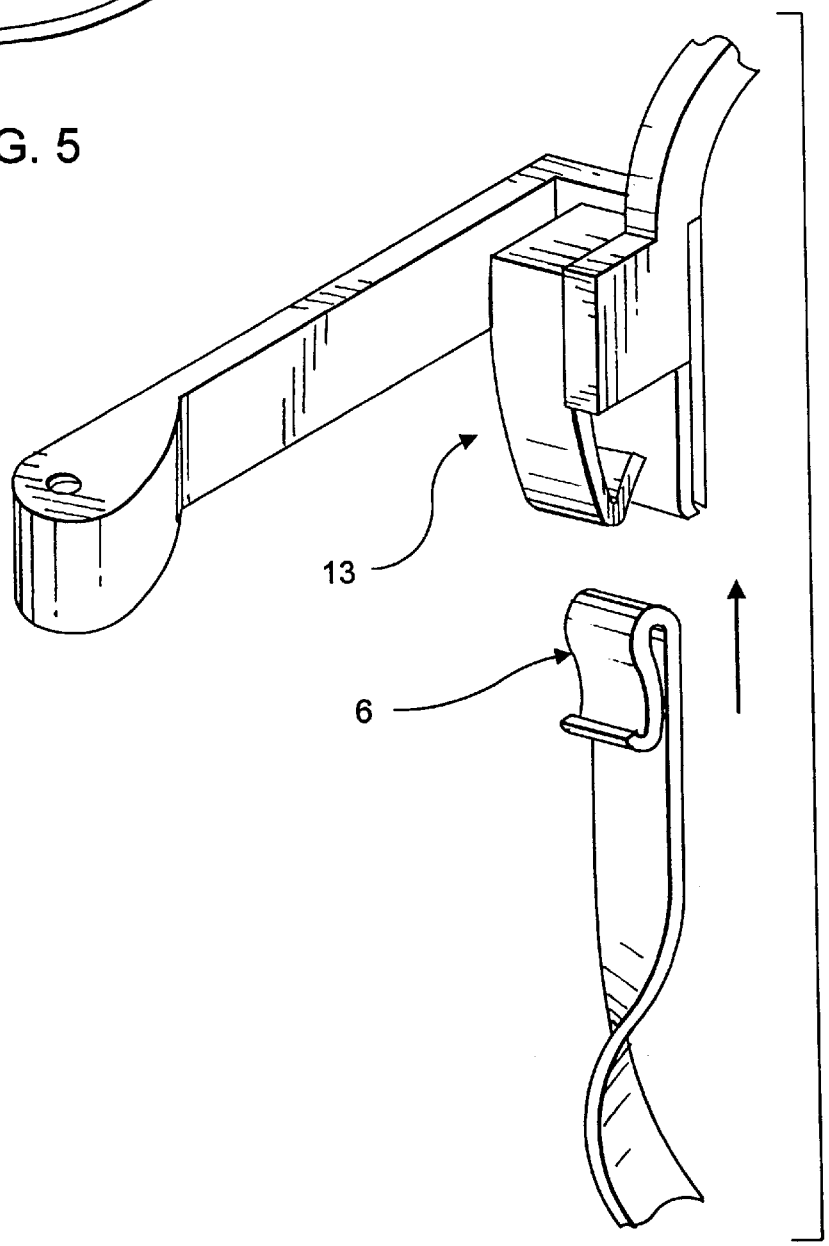
FIG. 6 shows a metal frame embodiment in a locked position.

Referring now to the second embodiment of a metal or wire-framed glasses, as shown in FIG. 6, a similar catch mechanism is employed in which a portion of the frame 1 acts as the hook or retainer piece 6 that latches in to the upper portion 13 of the frame 1.

Figure 7:
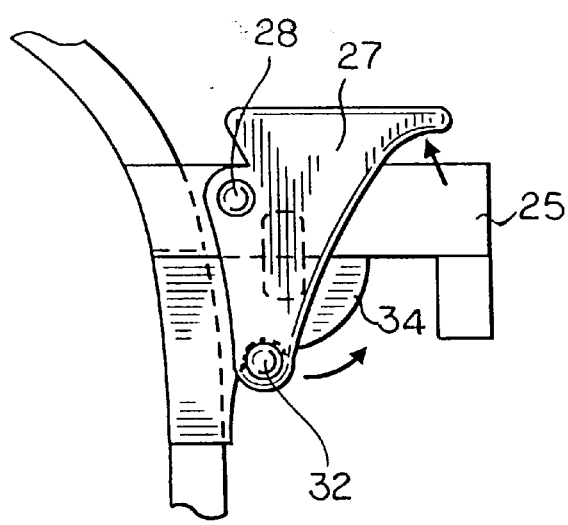
Figure 8:
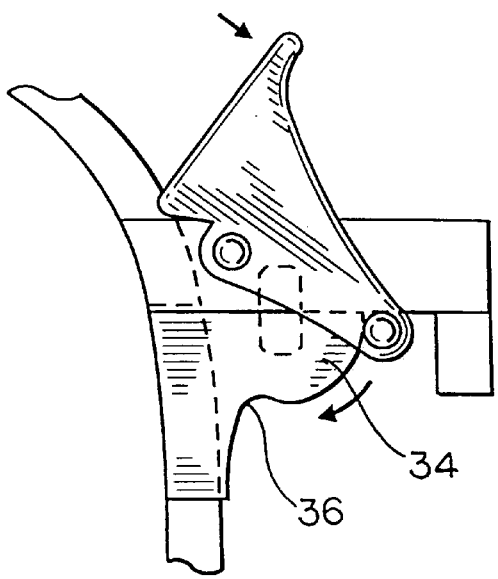
Figure 9:
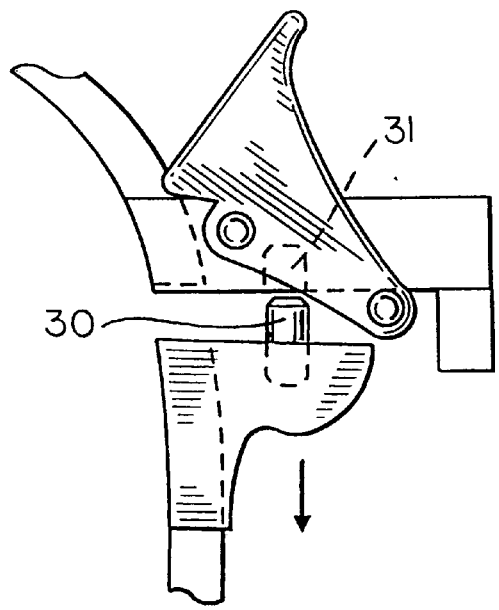

FIGS. 7–9 of the drawings illustrate another embodiment of the invention. As shown in FIG. 7, a rotatable latch 27 is employed for opening and closing the frame 1 for the removal of the lenses. FIG. 7 shows the frame 1 in the close-locked position. The frame 1 has a temple portion 25 which has an alignment recess in which an alignment pin 30 is positioned in place and the frame 1 is in the close-locked position of FIG. 7.

A rotatable latch (27) as shown in FIGS. 7–9 can be utilized to open the frame 1 for removal of the lenses. In the release position (see FIG. 9) the side of the frame 1 may be opened to release the lenses. When a new lens is held in place the user pushes the upper and lower sections of the frame together. An alignment pin 30 fits into the alignment recess 31 so that the ends of the frame will be near one another as they clamp (see FIG. 9).

When the user pushes the top of the rotatable latch 27 when the ends are close to one another by means of the alignment pin 30 and the alignment recess 31, the rotatable latch 27 moves or rotates clockwise about the pivot pin 28. The latch pin 32 moves in the contact with the cam 34 as the rotatable latch 37 rotates as shown in FIG. 8.

As rotatable latch 27 continues rotating in the clockwise direction, the latch pin 32 and the cam 34 become tighter due to the profile of the cam 34. As rotatable latch 27 continues to rotate in the clockwise direction, the rotatable latch 27 ends in position with the latch pin 32 engaged in the locking recess 36 as shown in FIG. 7.

The radial distance from the locking recess 36 to the pivot pin is shorter than it is to the cam 34. Therefore, the latch pin 32 utilizes the locking recess 36 in a detente fashion.

With the latch pin 32 locked within the locking recess 36, the rotatable latch 27 is held in a stable detente position. In this position, the frame is held together and cannot easily be removed.

By lifting the rotatable latch 27, counter clockwise rotation is started therein. The latching pin 32 is then released from the locking recess. The latch pin 32 moves along the cam 34, gradually reducing the tension between the upper and lower frame portions. The rotatable latch 27 rotates counter-clockwise until the latch pin 32 releases from the cam 34 (see FIG. 8). It is in this position that the upper/lower frame portions can be easily pulled apart from each other so that the lens can be removed (see FIG. 9).

An optional feature, shown in FIG. 7 of the drawings, is a limit screw 34, which prevents the frame from opening more than approximately 0.05 inches (see FIG. 8).

FIGS. 10–13 show another embodiment of the present invention in which a lever 304 is pivotally mounted onto the eyeglass frame 305 by means of pivot pin 303 (see FIG. 12) so that the lever 304 can open and close the eyeglass frame 305 with a restricted amount of movement to prevent the lenses from dropping out while opening or in the fully opened position and to ensure that the eyeglass frame 305 is closed flush in the closed position.

In the embodiment of FIG. 9 a slot 301 is provided for a journey pin 302M which the slot 301 moves along from one end at the journey pin 302 (FIG. 10) to the other end of the slot at the journey pin 302 (FIG. 11) from a closed position to an open position (and vice versa). The distance between the journey pin 302 and the pivot pin 303 is at its greatest when the lever is in the open position (See FIG. 11). The distance between the journey pin 302, the pivot pin 303, is at its smallest when the lever 304 and the frame 305 are in the closed position (See FIG. 10). This movement of the slot 301 about the journey pin 302 limits the distance which the frame 305 can be opened to preferably 0.1" for plastic frame and a 0.05" for a metal frame.

The preferable minimum distance between the journey pin 302 and the pivot pin 303 is 0.219 inches for the frame 305 and the lever 305 in the closed position and 1.4×0.219 inch distance between the journey pin 302 and the pivot pin 303 for the frame 305 and the lever 305 in the open position. Alternatively this mechanism can be reversed so that the lever 304 is opened or closed 180 degrees in the opposite direction from that shown in FIGS. 10 and 11. It is understood that these dimensions are not intended to be limiting and other frames of various sizes may be constructed of different dimensions in accordance with the present invention.

FIG. 13 shows a sectional view illustrating that pin 303 goes through sides A and B of lever 304 and the frame 305.

While presently preferred embodiments have been described for purposes of the disclosure, numerous changes in the arrangement of method steps and apparatus parts can be made by those skilled in the art. Such changes are encompassed within the spirit of the invention as defined by the appended claims.

We claim:

1. An eyeglass frame:
an eyeglass frame having lenses and a bottom portion and an upper portion; a resilient member housed in said bottom portion of said frame, said resilient member having a retainer member at each end of said resilient member;

said upper portion of said frame, having on each side a shoulder portion on which a one of each said retainer member latches thereon to securely close said eyeglass frame and contain said lenses therein; and means for disengaging each said retainer-member by pulling on a portion of each said shoulder so that said retainer-member disengages said shoulder on a side of this said frame to permit said lenses to be removed and inserted.

2. An eyeglass frame:

an eyeglass frame according to claim 1 wherein said shoulder member acts as a retainer plate and includes a leg and wherein a recess is located between said leg and a rear portion of said eyeglass frame so that the leg portion of the shoulder member can be reached through the recess and pulled to release said retaining member from said shoulder.

3. An eyeglass frame according to claim 1 wherein said resilient means is a spring.

4. An eyeglass frame according to claim 1 wherein said retainer member is hook shaped.

5. An eyeglass frame according to claim 1 wherein each said shoulder is located near a corresponding temple area on said eyeglass frame.

6. An eyeglass frame according to claim 1 wherein said frame is made of plastic material.

7. An eyeglass frame according to claim 1 wherein said eyeglass frame is made of metal.

8. An eyeglass frame according to claim 1 further comprised a limit screw in said frame which limits the amount for which said frame opens.

9. An eyeglass frame:

an eyeglass frame having lenses and a bottom portion and an upper portion;

the bottom portion of said eyeglass frame having at each end a retainer member;

said upper portion of said frame having on each side a shoulder portion on which a one of said member latches thereon to securely cross said eyeglass frame and contain said lenses therein; and means for disengaging said retainer member by pulling a portion of each said shoulder so that said retainer member disengages said shoulder on a side of such frame to remove and insert said lenses.

10. An eyeglass frame according to claim 9 wherein said shoulder member is formed with a portion onto which said retainer member latches thereon.

11. An eyeglass frame according to claim 9 wherein each said shoulder member is located near a temple portion of said eyeglass frame.

12. A metal eyeglass frame:

an eyeglass frame formed of metal material and having lenses and a bottom portion and an upper portion; said bottom portion of said frame forming said retainer member at an end of said bottom portion adjacent said top portion;

said upper portion of said frame, having on each side a shoulder portion having a recess therebetween within which said retainer member latches therein to securely close said eyeglass frame and contain said lenses therein; and means for disengaging each said retainer member by pulling on a portion of each said shoulder so that said retainer member disengages from with said recess of to permit said lenses to be removed and inserted.

13. An eyeglass frame having lenses and a bottom portion and an upper portion;

said upper portion attached to said eyeglass frame having on each side a temple portion, said temple portion having a side;

a means for disengaging said lenses, said disengaging means attached to said eyeglass frame and to the side of said temple portion of said frame;

a means for pivoting the disengaging means, said means for pivoting housed within said disengaging means and connected to said frame;

a cam means attached to the bottom portion of said eyeglass frame; said cam having a locking recess and engaging means; said engaging means following an arc along a circumference of said cam when disengaging means are released; said locking recess holding said engaging means securely in place when said disengaging means are in a substantially horizontal position; and a means for aligning located in said cam for aligning with an alignment recess in said frame to assist the user to align the upper and bottom portions of the eyeglass frame during the clamping.

14. An eyeglass frame according to claim 13 wherein said means for disengaging is a rotatable latch.

15. An eyeglass frame according to claim 13 wherein said means for pivoting is a pivot pin.

16. An eyeglass frame according to claim 13 wherein said engagement means is a latch pin.

17. An eyeglass frame according to claim 13 wherein said temple position of said frame has an alignment recess said aligning means is an alignment pin which moves in and out of said alignment recess when said frame is closed and opened.

18. An eyeglass frame:

an eyeglass frame having lenses and an upper portion and a lower portion and a lever pivotally mounted onto said frame;

said lever having a slot, said slot having a first end and a second end;

a journey pin disposed in said slot of said lever and fixedly connected to said upper portion of frame;

a pivot pin fixedly connected to said lower portion of said frame and pivotally connected to said lever;

whereby said lever rotates in a first direction to open said frame for removal and changing of said lenses, said slot moves about said journey pin from said first end of said slot to said second end of said slot so that said journey pin and said pivot pin are at a maximum distance apart when said frame is fully opened, thereby limiting amount said frame can be opened to prevent said lenses from falling out, and when said lever rotates in a second direction opposite said first direction to close said frame, said slot moves about said journey pin to the second end of said two ends of said slot so that said journey pin and said pivot pin are at a minimum distance apart when said frame is fully closed.

19. An eyeglass frame according to claim 18 wherein said second end of said slot has a groove into which said journey pin lockingly engages to keep said eyeglass frame closed flush.

20. An eyeglass frame according to claim 18 wherein said lever has a handle for user to manually adjust said lever to open and close said frame.

* * * * *